United States Patent
Kramr

(12) Patent No.: US 6,394,362 B1
(45) Date of Patent: May 28, 2002

(54) TRACTION ENHANCING MAT

(76) Inventor: Patrick J. Kramr, 6722 Creek Village Dr., Katy, TX (US) 77449

( * ) Notice: Subject to any disclaimer, the term of this patent is extended or adjusted under 35 U.S.C. 154(b) by 0 days.

(21) Appl. No.: 09/827,743

(22) Filed: Apr. 6, 2001

(51) Int. Cl.$^7$ .............................................. E01B 23/00
(52) U.S. Cl. ...................................................... 238/14
(58) Field of Search ........................................ 238/14

(56) References Cited

U.S. PATENT DOCUMENTS

| | | |
|---|---|---|
| 1,410,055 A | 3/1922 | Brain |
| 3,425,624 A | 2/1969 | Jacobs |
| 3,701,474 A | 10/1972 | Welz |
| 4,121,765 A | 10/1978 | Fosteris |
| 4,211,366 A | 7/1980 | Czarnota |
| 4,998,670 A | 3/1991 | Peterson |
| 5,204,159 A * | 4/1993 | Tan .............................. 238/14 |
| D364,837 S | 12/1995 | Hargrove |
| 5,538,183 A | 7/1996 | Mcgee |
| 5,862,983 A * | 1/1999 | Andrus et al. ................ 238/14 |

* cited by examiner

Primary Examiner—S. Joseph Morano
Assistant Examiner—Robert J. McCarry, Jr.

(57) ABSTRACT

A traction enhancing mat allowing a user to get their vehicle unstuck without requiring assistance from an outside source. The traction enhancing mat includes a first panel member that has plurality of upwardly extending ridges such that the ridges are adapted for enhancing traction of the tire of the vehicle in a rut. A second panel is coupled to the first panel such that the second panel is adapted for providing traction to the tire when the tire is out of the rut. A plurality of ground engaging blades is coupled to a bottom of the second panel such that the ground engaging blades are adapted for sinking into a ground surface. The ground engaging blades are adapted for preventing the second panel from being drug under the tire of the vehicle when the vehicle tries to get out of the rut.

9 Claims, 2 Drawing Sheets

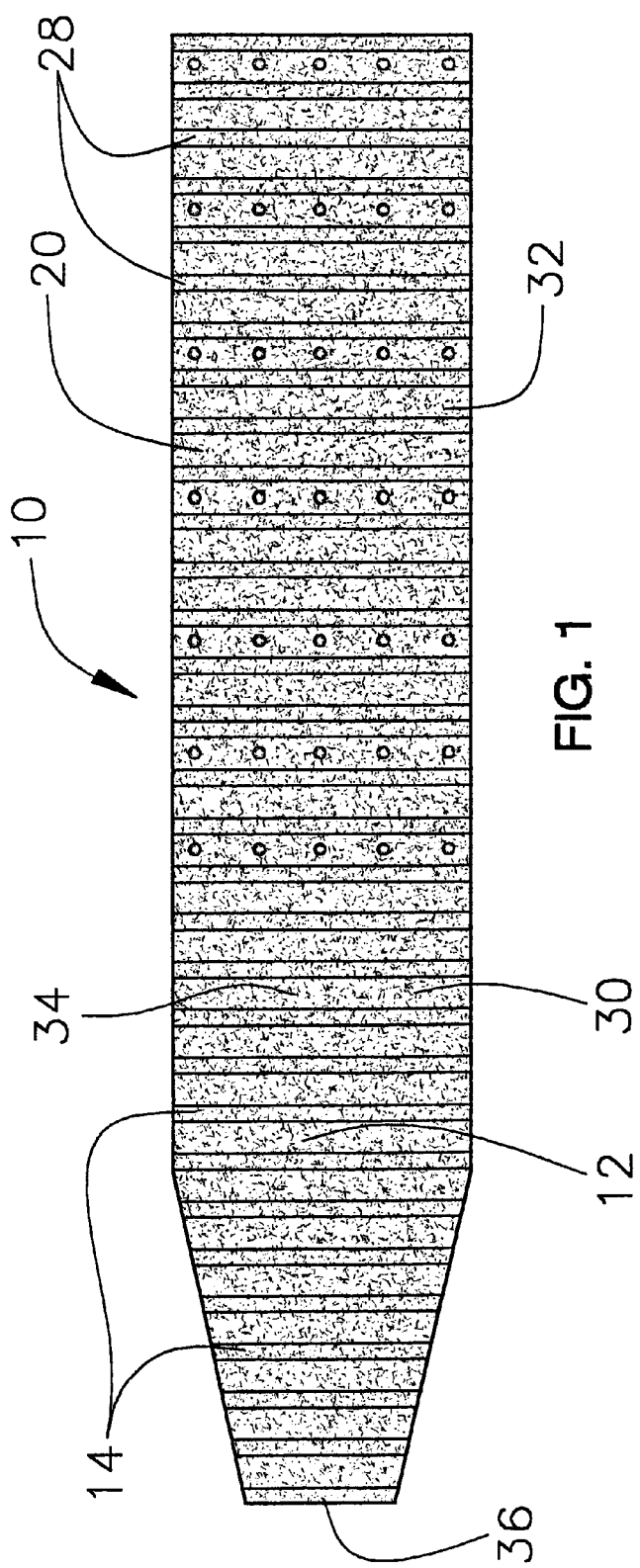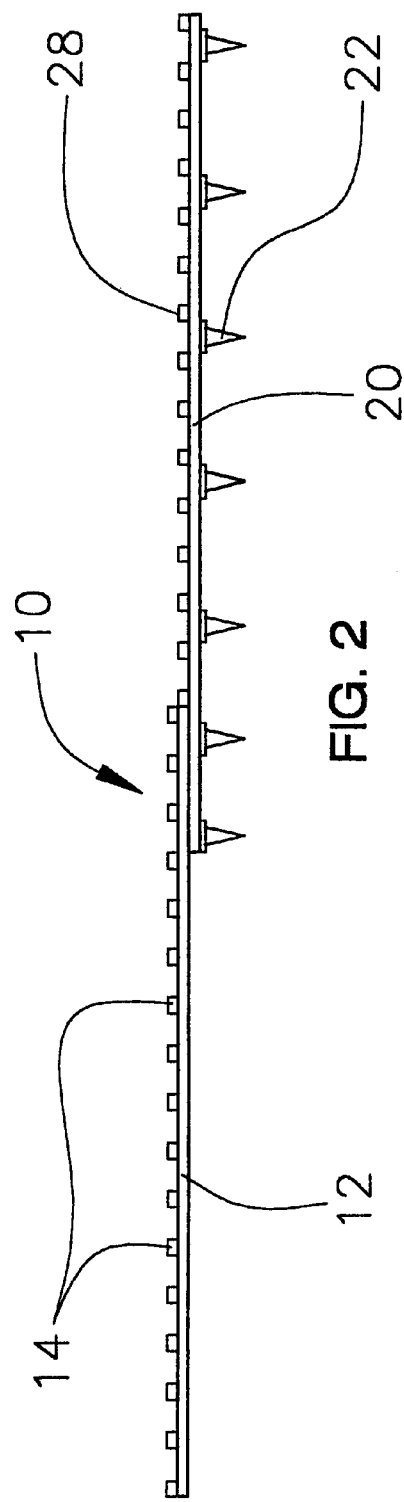

TRACTION ENHANCING MAT

BACKGROUND OF THE INVENTION

1. Field of the Invention

The present invention relates to traction enhancing mats and more particularly pertains to a new traction enhancing mat for allowing a user to get their vehicle unstuck without requiring assistance from an outside source.

2. Description of the Prior Art

The use of traction enhancing mats is known in the prior art. More specifically, traction enhancing mats heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 4,998,670; 4,121,765; 4,211,366; 3,425,624; 1,410,055; 3,701,474; 5,538,183 and U.S. Pat. No. Des. 364,837.

While these devices fulfill their respective, particular objectives and requirements, the aforementioned patents do not disclose a new traction enhancing mat. The inventive device includes a first panel member that has plurality of upwardly extending ridges such that the ridges are adapted for enhancing traction of the tire of the vehicle in a rut. A second panel is coupled to the first panel such that the second panel is adapted for providing traction to the tire when the tire is out of the rut. A plurality of ground engaging blades is coupled to a bottom of the second panel such that the ground engaging blades are adapted for sinking into a ground surface. The ground engaging blades are adapted for preventing the second panel from being drug under the tire of the vehicle when the vehicle tries get out of the rut.

In these respects, the traction enhancing mat according to the present invention substantially departs from the conventional concepts and designs of the prior art, and in so doing provides an apparatus primarily developed for the purpose of for allowing a user to get their vehicle unstuck without requiring assistance from an outside source.

SUMMARY OF THE INVENTION

In view of the foregoing disadvantages inherent in the known types of traction enhancing mats now present in the prior art, the present invention provides a new traction enhancing mat construction wherein the same can be utilized for allowing a user to get their vehicle unstuck without requiring assistance from an outside source.

The general purpose of the present invention, which will be described subsequently in greater detail, is to provide a new traction enhancing mat apparatus and method which has many of the advantages of the traction enhancing mats mentioned heretofore and many novel features that result in a new traction enhancing mat which is not anticipated, rendered obvious, suggested, or even implied by any of the prior art traction enhancing mats, either alone or in any combination thereof.

To attain this, the present invention generally includes a first panel member that has plurality of upwardly extending ridges such that the ridges are adapted for enhancing traction of the tire of the vehicle in a rut. A second panel is coupled to the first panel such that the second panel is adapted for providing traction to the tire when the tire is out of the rut. A plurality of ground engaging blades is coupled to a bottom of the second panel such that the ground engaging blades are adapted for sinking into a ground surface. The ground engaging blades are adapted for preventing the second panel from being drug under the tire of the vehicle when the vehicle tries to get out of the rut.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new traction enhancing mat apparatus and method which has many of the advantages of the traction enhancing mats mentioned heretofore and many novel features that result in a new traction enhancing mat which is not anticipated, rendered obvious, suggested, or even implied by any of the prior art traction enhancing mats, either alone or in any combination thereof.

It is another object of the present invention to provide a new traction enhancing mat, which may be easily and efficiently manufactured and marketed.

It is a further object of the present invention to provide a new traction enhancing mat, which is of a durable and reliable construction.

An even further object of the present invention is to provide a new traction enhancing mat which is susceptible of a low cost of manufacture with regard to both materials and labor, and which accordingly is then susceptible of low prices of sale to the consuming public, thereby making such traction enhancing mat economically available to the buying public.

Still yet another object of the present invention is to provide a new traction enhancing mat which provides in the apparatuses and methods of the prior art some of the advantages thereof, while simultaneously overcoming some of the disadvantages normally associated therewith.

Still another object of the present invention is to provide a new traction enhancing mat for allowing a user to get their vehicle unstuck without requiring assistance from an outside source.

Yet another object of the present invention is to provide a new traction enhancing mat which includes a first panel member that has plurality of upwardly extending ridges such that the ridges are adapted for enhancing traction of the tire of the vehicle in a rut. A second panel is coupled to the first panel such that the second panel is adapted for providing traction to the tire when the tire is out of the rut. A plurality of ground engaging blades is coupled to a bottom of the second panel such that the ground engaging blades are adapted for sinking into a ground surface. The ground engaging blades are adapted for preventing the second panel from being drug under the tire of the vehicle when the vehicle tries to get out of the rut.

Still yet another object of the present invention is to provide a new traction enhancing mat that save a user the hassle, expense, and embarrassment of having a tow truck called to the scene.

Even still another object of the present invention is to provide a new traction enhancing mat that would be of durable, portable, affordable, and easily adapted to different vehicles.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a top view of a new traction enhancing mat according to the present invention.

FIG. 2 is a side view of the present invention.

DESCRIPTION OF THE PREFERRED EMBODIMENT

Figure 3:
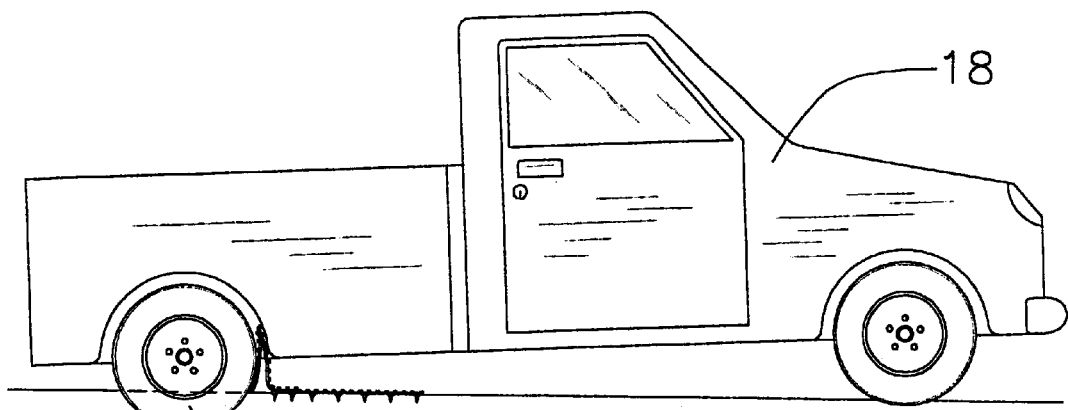
FIG. 3 is a side view of the present invention.
Figure 4:
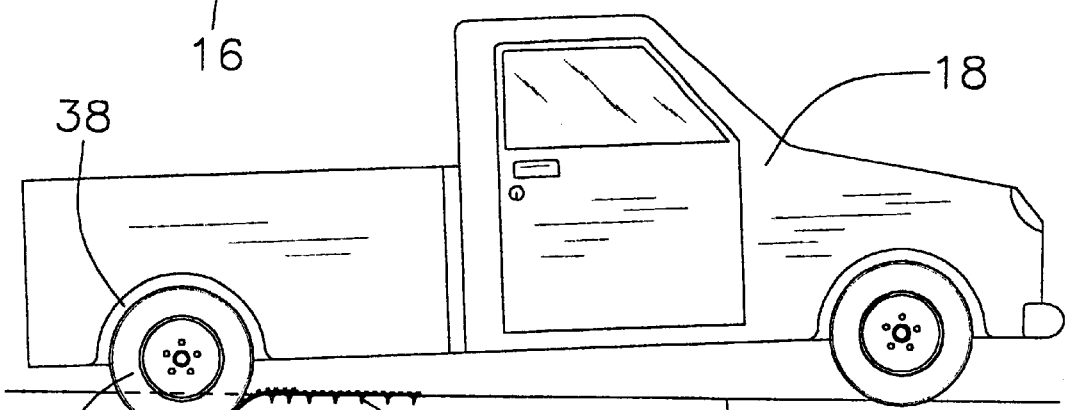
FIG. 4 is a side view of the present invention.
Figure 5:
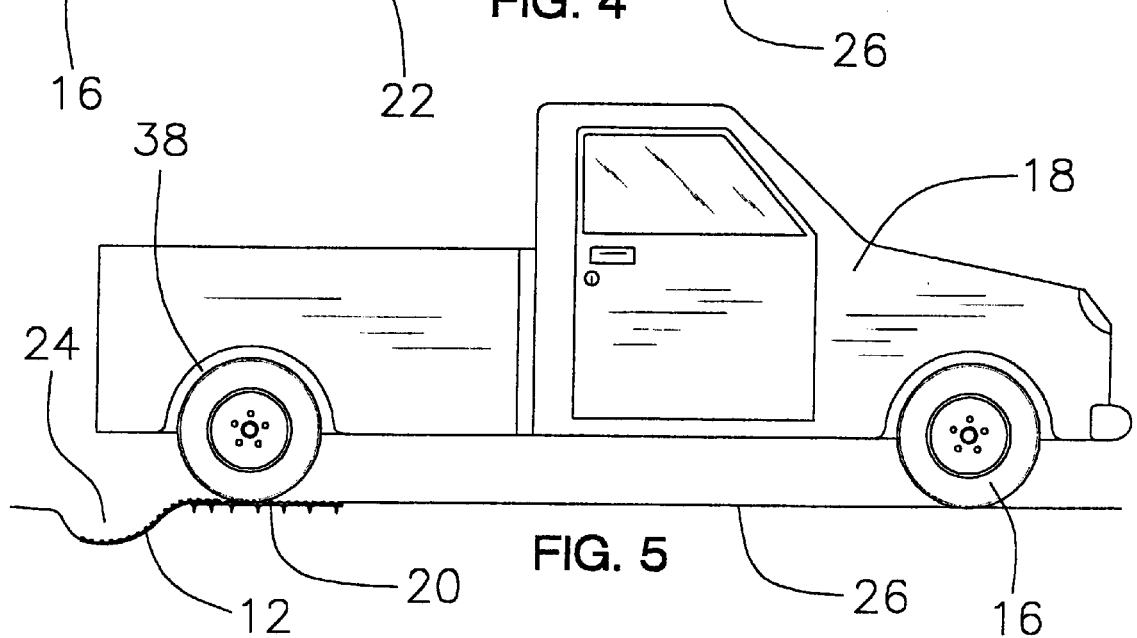
FIG. 5 is a side view of the present invention.

With reference now to the drawings, and in particular to FIGS. 1 through 5 thereof, a new traction enhancing mat embodying the principles and concepts of the present invention and generally designated by the reference numeral 10 will be described.

As best illustrated in FIGS. 1 through 5, the traction enhancing mat 10 generally includes a first panel member 12 that has plurality of upwardly extending ridges 14 such that the ridges 14 are adapted for enhancing traction of the tire 16 of the vehicle 18 in a rut. A second panel 20 is coupled to the first panel 12 such that the second panel 20 is adapted for providing traction to the tire 16 when the tire 16 is out of the rut 24. A plurality of ground engaging blades 22 are coupled to a bottom of the second panel 20 such that the ground engaging blades 22 are adapted for sinking into a ground surface 26. The ground engaging blades 22 are adapted for preventing the second panel 20 from being drug under the tire 16 of the vehicle 18 when the vehicle tries to get out of the rut 24.

Each of the ridges 14 of the first panel 12 extends along width of the first panel 12 for providing traction across the width of the first panel 12. The second panel 20 has a plurality of ribs 28 that upwardly extend from the second panel 20. The plurality of ribs 28 are adapted for enhancing traction of the tire 16 of the vehicle 18 when the tire 16 is out of the rut 24.

The ribs 28 of the second panel 20 extend along width of the second panel 20 for providing traction across the width of the second panel 20. An upper surface 30 of the first panel 12 and a top surface 32 of the second panel 20 have an abrasive 34. The abrasive 34 is adapted for enhancing traction between the tire 16 of the vehicle 18 and the first and second panel 12.

The first panel 12 has a leading portion 36 such that the leading portion 36 is tapered inwardly. The leading portion 36 is adapted for facilitating insertion of the first panel 12 between the tire 16 and the rut 24. The first panel 12 includes a flexible material such that the first panel 12 is adapted for folding between the tire 16 and a wheel well 38 of the vehicle 18 for pulling of the first panel 12 between the tire 16 and the rut 24 when the tire 16 of the vehicle 18 is rotated.

The second panel 20 includes a flexible material adapted for facilitating insertion of the second panel 20 under a body of the vehicle 18 in front of the tire 16.

In use, the leading portion would be slipped between the tire and the fender of the vehicle, with the second panel extending forward toward the front end of the vehicle. As the gas pedal is depressed, the leading portion would be drawn underneath the tire, with the tire catching the ridges. The ground engaging blades of the present invention would dig into the surrounding area. The vehicle would move forward over the second panel section and its own weight would help the ground engaging blades dig in. The vehicle would gain enough traction to pull itself out of the soft area.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A traction enhancing mat for enhancing traction for a tire of a vehicle that is mired, the traction enhancing mat comprising:

a first panel member having plurality of upwardly extending ridges such that said ridges are adapted for enhancing traction of the tire of the vehicle in a rut, a lower surface of said first panel being a flat surface such that said flat surface of said lower surface is adapted for facilitating insertion of said first panel between the tire and the rut;

a second panel being coupled to said first panel such that said second panel is adapted for providing traction to the tire when the tire is out of the rut; and a plurality of ground engaging blades being coupled to a bottom of said second panel such that said ground engaging blades are adapted for sinking into a ground surface whereby said ground engaging blades are adapted for preventing said second panel from being drug under the tire of the vehicle when said vehicle tries to get out of the rut.

2. The traction enhancing mat as set forth in claim 1, wherein each of said ridges of said first panel extends along a width of said first panel for providing traction across said width of said first panel.

3. The traction enhancing mat as set forth in claim 1, wherein said second panel has a plurality of ribs upwardly extending from said second panel, said plurality of ribs being adapted for enhancing traction of the tire of the vehicle when the tire is out of the rut.

4. The traction enhancing mat as set forth in claim 3, wherein each of said ribs of said second panel extends along a width of said second panel for providing traction across said width of said second panel.

5. The traction enhancing mat as set forth in claim 3, wherein an upper surface of said first panel and a top surface of said second panel has an abrasive, said abrasive being adapted for enhancing traction between the tire of the vehicle and said first and second panel.

6. The traction enhancing mat as set forth in claim 3, wherein said first panel has a leading portion such that said leading portion is tapered inwardly, said leading portion being adapted for facilitating insertion of said first panel between the tire and the rut.

7. The traction enhancing mat as set forth in claim 1, wherein said first panel comprises a flexible material such that said first panel is adapted for folding between the tire and a wheel well of the vehicle for pulling of said first panel between the tire and the rut when the tire of the vehicle is rotated.

8. The traction enhancing mat as set forth in claim 1, wherein said second panel comprises a flexible material adapted for facilitating insertion of said second panel under a body of the vehicle in front of the tire.

9. A traction enhancing mat for enhancing traction for a tire of a vehicle that is mired, the traction enhancing mat comprising:

a first panel member having plurality of upwardly extending ridges such that said ridges are adapted for enhancing traction of the tire of the vehicle in a rut, a lower surface of said first panel being a flat surface such that said flat surface of said lower surface is adapted for facilitating insertion of said first panel between the tire and the rut;

a second panel being coupled to said first panel such that said second panel is adapted for providing traction to the tire when the tire is out of the rut;

a plurality of ground engaging blades being coupled to a bottom of said second panel such that said ground engaging blades are adapted for sinking into a ground surface whereby said ground engaging blades are adapted for preventing said second panel from being drug under the tire of the vehicle when said vehicle tries to get out of the rut;

wherein each of said ridges of said first panel extends along a width of said first panel for providing traction across said width of said first panel;

wherein said second panel has a plurality of ribs upwardly extending from said second panel, said plurality of ribs being adapted for enhancing traction of the tire of the vehicle when the tire is out of the rut;

wherein each of said ribs of said second panel extends along a width of said second panel for providing traction across said width of said second panel;

wherein an upper surface of said first panel and a top surface of said second panel has an abrasive, said abrasive being adapted for enhancing traction between the tire of the vehicle and said first and second panel;

wherein said first panel has a leading portion such that said leading portion is tapered inwardly, said leading portion being adapted for facilitating insertion of said first panel between the tire and the rut;

wherein said first panel comprises a flexible material such that said first panel is adapted for folding between the tire and a wheel well of the vehicle for pulling of said first panel between the tire and the rut when the tire of the vehicle is rotated; and wherein said second panel comprises a flexible material adapted for facilitating insertion of said second panel under a body of the vehicle in front of the tire.

* * * * *